April 6, 1965 W. C. BELK 3,176,736
APPARATUS FOR SECTIONIZING CITRUS FRUIT
Filed April 10, 1962 4 Sheets-Sheet 1
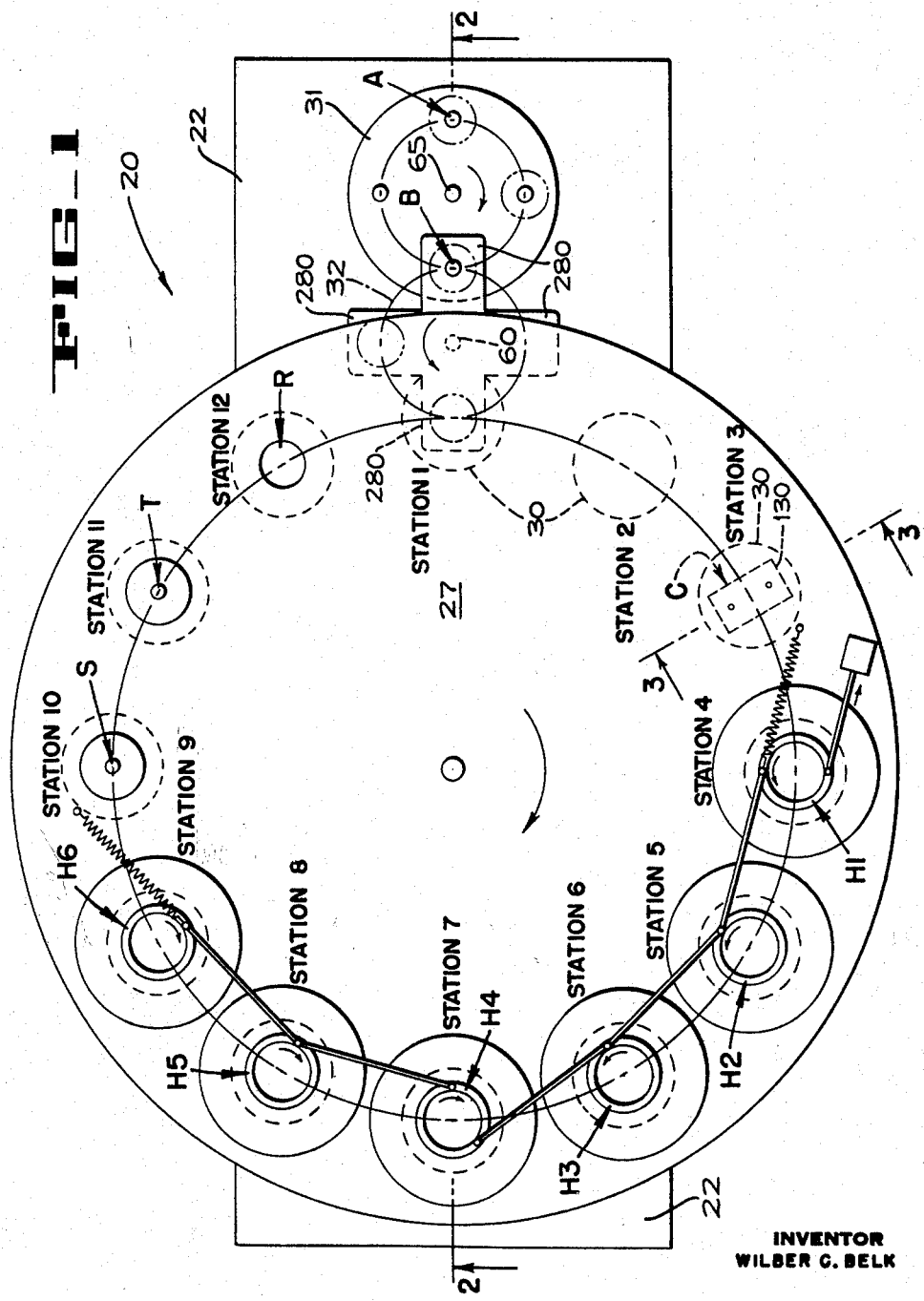
FIG_1
INVENTOR
WILBER C. BELK
BY Hans G. Hoffmeister
ATTORNEY

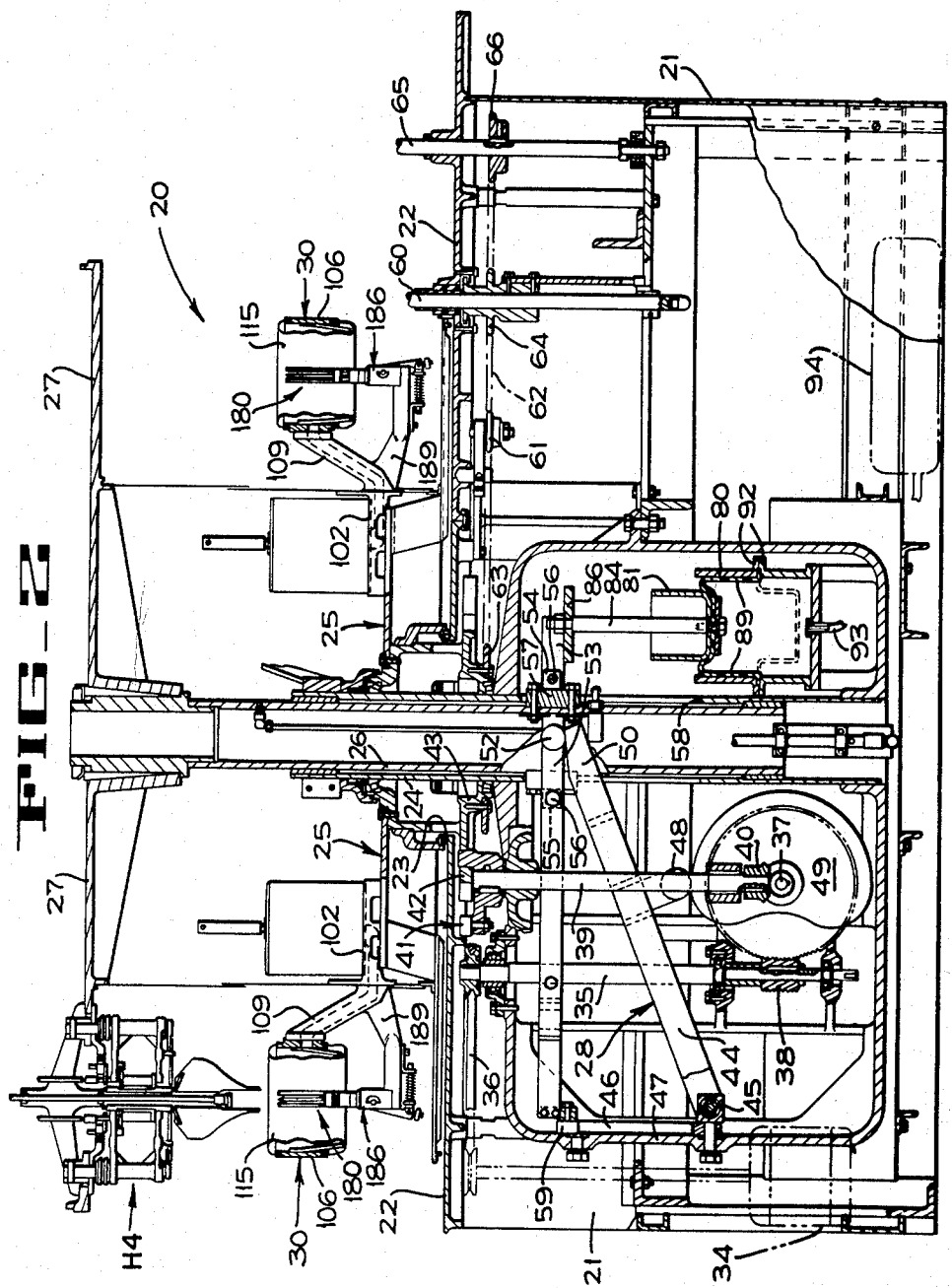

April 6, 1965  W. C. BELK  3,176,736
APPARATUS FOR SECTIONIZING CITRUS FRUIT
Filed April 10, 1962  4 Sheets-Sheet 3
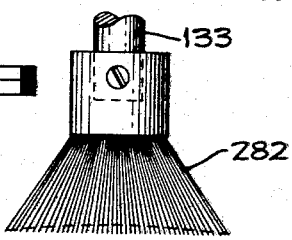
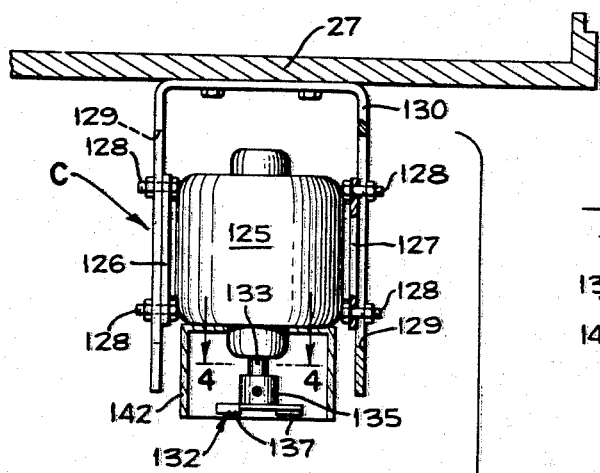
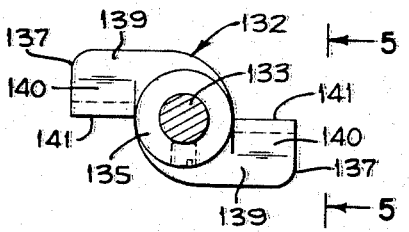
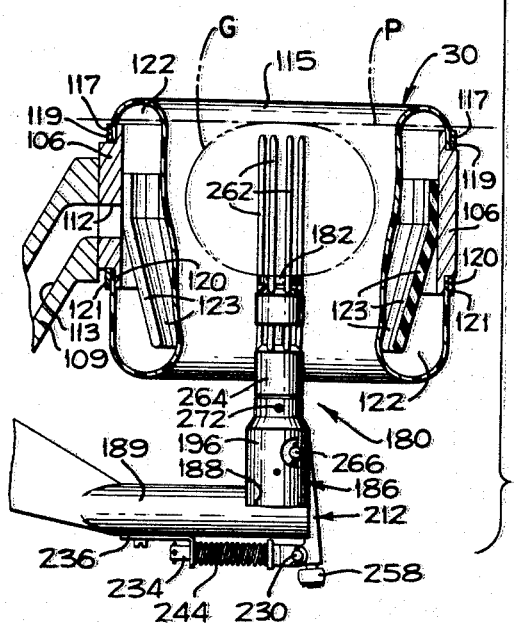
INVENTOR
WILBER C. BELK
BY Hans G. Hoffmeister
ATTORNEY April 6, 1965  W. C. BELK  3,176,736
APPARATUS FOR SECTIONIZING CITRUS FRUIT
Filed April 10, 1962  4 Sheets-Sheet 4
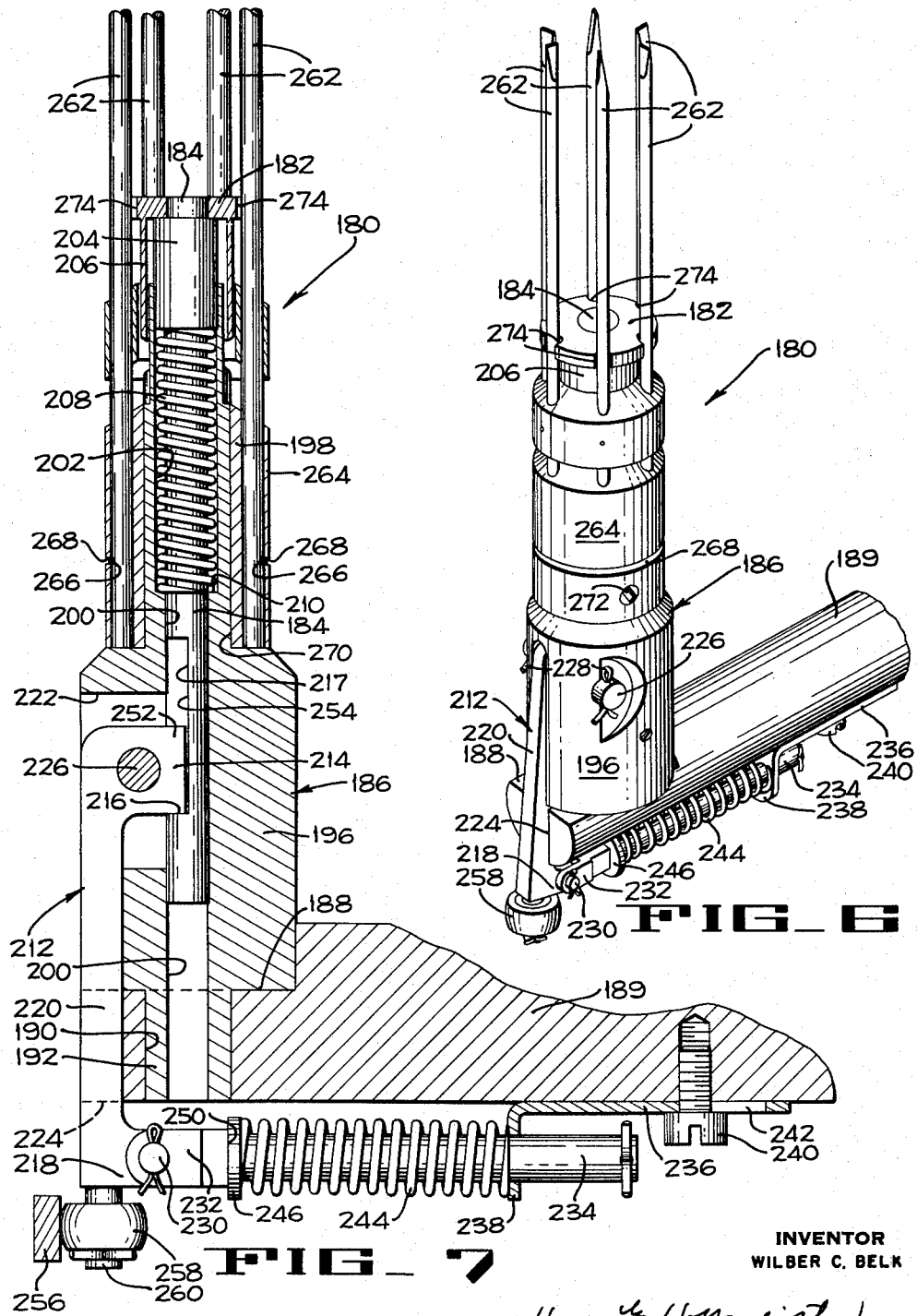
INVENTOR
WILBER C. BELK
BY Hans G. Hoffmeister
ATTORNEY United States Patent Office 3,176,736
Patented Apr. 6, 1965

3,176,736
APPARATUS FOR SECTIONIZING CITRUS FRUIT
Wilber C. Belk, Lakeland, Fla., assignor to FMC Corporation, San Jose, Calif., a corporation of Delaware
Filed Apr. 10, 1962, Ser. No. 186,380
3 Claims. (Cl. 146—3)

The present invention pertains to an improved apparatus for sectionizing citrus fruit.

In the process of sectionizing citrus fruit, such as grapefruit, the fruit is first peeled and then subjected to a lye treatment to remove the tough membrane that encircles the entire periphery of the fruit. During this peeling operation, it often happens that some peel is not removed from the blossom end of the fruit. When such fruit is subjected to the lye treatment, the peel remaining on the fruit prevents the lye from contacting the membrane at the blossom end of the fruit. As a result, when the fruit reaches the sectionizing machine, the membrane is still intact. In one type of sectionizing machine, a sectionizing blade which has a probe at its lower end is used. At the start of a sectionizing operation, the probe is first moved down into a grapefruit at the blossom end to penetrate into a V-shaped meat segment at the apex of the segment. When the probe has penetrated a short distance into the segment, it is moved laterally to "find" the adjacent radial membrane of the fruit so that, during subsequent downward movement, the blade will lie close to the membrane. If the peripheral membrane is still intact when the lateral movement of the probe is started, it and the juice sacs in the fruit resist the lateral movement of the probe. If the force with which the probe is made great enough to overcome this resistance, it will also break through the radial membrane which it is trying to "find." Similarly, if the probe is provided with sharp teeth to cut through the juice sacs and the peripheral membrane, it may also cut through the radial membrane. Accordingly, an object of the present invention is to provide means for positively removing the peripheral membrane at the blossom end of the fruit so that movement of the sectionizing blades in the fruit will not be impeded by the membrane.

Another object is to provide a mechanism for cutting the portion of the peripheral membrane at the blossom end of a citrus fruit away from the flesh of the fruit.

Other and further objects and advantages of the present invention will be apparent from the following description taken in connection with the accompanying drawings, in which:

FIGURE 1 is a schematic top plan view of a citrus sectionizing machine incorporating the membrane removal mechanism of the present invention.

FIGURE 2 is a diagrammatic longitudinal vertical section taken on line 2—2 of FIG. 1.

FIGURE 3 is an enlarged fragmentary diagrammatic vertical section taken on line 3—3 of FIG. 1.

FIGURE 4 is an enlarged horizontal diagrammatic section taken on line 4—4 of FIG. 3.

FIGURE 5 is a fragmentary diagrammatic side elevation taken looking in the direction of arrows 5—5 of FIG. 4.

FIGURE 6 is a fragmentary perspective of a fruit positioning unit used in the machine of FIG. 1.

FIGURE 7 is an enlarged central section taken longitudinally through the unit of FIG. 6.

FIGURE 8 is a diagrammatic elevation, similar to FIG. 5, but showing a modified membrane removing mechanism.

The sectionizing machine 20 of the present invention comprises a base 21 (FIG. 2) having a fixed table top 22 that has a central opening 23. A stationary tubular post 24 is secured in the base and projects upwardly through the opening 23. Near the upper end of the post 24, a main turret 25 is mounted for rotation around the post, and an inner tubular post 26 is slidably journaled inside the main post 24 in suitable bushings. A circular tool carrier plate 27 is mounted on the upper end of the slidable post 26 which is arranged to be raised and lowered by a lift mechanism 28. When the tool carrier 27 is raised and lowered, it moves several fruit processing units mounted thereon into and out of engagement with fruit held in twelve fruit carriers 30 which are mounted around the periphery of the turret 25 at twelve equi-spaced positions designated as stations 1–12 in the plan view of FIG. 1. The fruit processing units include a membrane cutter C (FIG. 1) at station 3, six sectionizing heads H1–H6 (FIGS. 1 and 2) at stations 4–9 respectively, a fruit shaker S at station 10, a spinner T (FIG. 1) at station 11, and a core remover R at station 12. There is no fruit processing unit on the tool carrier 27 at station 1 since, at this station, the only operation that takes place is the depositing of a fruit in the carrier. Also mounted above the table top 22 is a fruit feed turret 31 and a transfer turret 32.

During operation of the machine 20, fruit to be sectionized is advanced on a supply conveyor (not shown) to a point within reach of an operator who is positioned adjacent the feed turret 31. The operator places the grapefruit, one by one, on the feed turret at station A with the blossom end of the fruit projecting upwardly, said turret being arranged to be intermittently indexed through 90° angular movements in a clockwise direction (FIG. 1) to bring each grapefruit to a transfer station B where the fruit is automatically transferred from the feed turret to the transfer turret 32 which is also arranged to be intermittently indexed in 90° increments in synchronism with the movements of feed turret 31, but in a counterclockwise direction. The grapefruit is then moved to station 1 of the main turret where it is deposited in one of the fruit carriers 30. The main turret 25 is arranged to be intermittently indexed through 30° angular increments in a clockwise direction (FIG. 1) to move the grapefruit successively to the twelve stations of the machine.

The feed turret 31 and the transfer turret 32 may be identical to the feed and transfer turrets of the sectionizing machine disclosed in the copending U.S. application of H. W. Grotewold, Ser. No. 730,335, filed April 23, 1958 now Patent No. 3,072,160, and assigned to the assignee of the present invention. Since the construction of these turrets do not form part of the present invention, they will not be described in detail, however, reference may be had to the above-identified Grotewold application for a complete description of any mechanisms of the present machine that is not described herein in detail. Similarly, the main turret 25, its operating mechanism, and the sectionizing heads H1–H6 may be of the type disclosed in my pending application Ser. No. 109,798 which was filed on March 9, 1961, and reference may be had to this application for details of construction.

The drive mechanism for the machine is mounted in the base 21 and includes a motor 34 that is shown in phantom lines in sectional view FIG. 2 since it is located behind the plane of this section. The motor drives a vertical shaft 35 through a belt and pulley drive 36. A horizontal shaft 37, which is driven from shaft 35 through a worm gear unit 38, drives a second vertical shaft 39 by means of a bevel gear unit 40. The vertical shaft 39 effects intermittent movement of the main turret 25 through a Geneva drive mechanism 41 which has a driven gear 42 formed on a lower hub portion 43 of the turret 25.

The lift mechanism 28, which controls the raising and lowering of the inner slidable tubular post 26, comprises a lever 44 pivotally mounted at 45 on the lower end of a vertical guide bar 46 that is bolted to a rigid wall 47 of the base 21. A roller follower 48, that is carried by the lever 44, rides along the surface of a cam 49 which is keyed to shaft 37. The lever 44 has a yoke 50 formed on its outer end which engages two diametrically opposed rollers 52 (one only being shown) that are carried by a pair of parallel bars 53. The bars 53 are secured together by two transverse bars 54 and 55 to which the bars 53 are secured by capscrews 56. A pad 57, formed on transverse bar 54, projects through an opening 58 in the stationary post 24 and is bolted to the inner slidable post 26. The transverse bar 55 is bolted to the slidable post 26 in the same manner. Thus, when the cam 49 is rotated, the lift mechanism 28 raises and lowers the slidable post 26 by means of the collar formed by the parallel bars 53 and transverse bars 54 and 55.

To prevent rotation of the post 26 while it is being raised and lowered, two rollers 59 (one only being shown) are mounted on the ends of the bars 53, one roller being disposed on each side of the fixed guide bar 46.

The transfer turret 32 has a drive shaft 60 that is driven from the hub portion 43 of the main turret 25 by a chain 62 that is trained around a sprocket 63 on said hub portion and an idler sprocket 61, and engages a sprocket 64 keyed to the transfer turret shaft 60. Similarly, a drive shaft 65 of the feed turret 31 is driven by the chain 62 which is disposed around a sprocket 66 keyed to the shaft 65. The chain is trained around sprockets 64 and 66 in opposite directions so that the two turrets 31 and 32 are rotated in opposite directions. It will be evident that the three turrets 25, 31 and 32 are intermittently driven in timed relation through the Geneva drive 41.

The weight of the tool carrier plate 27 and its associated mechanism is carried jointly by the cam 49 and a pneumatic counterbalance mechanism which includes an open top cylinder 80, that is secured to the base, and a piston 81 that is slidable in the cylinder. A piston rod 84 is secured to a plate 86 that is bolted to the parallel bars 53, the upper end of rod 84 being disposed between the bars. A generally tubular, flexible, air tight expansible and contractible air reservoir 89 is disposed within cylinder 80 below the piston 81. The reservoir should be made of a thin material that is air tight, pliable, and resistant to citric acid. A material which has been found to be satisfactory is a nylon cloth impregnated with a synthetic rubber such as nitrile. The reservoir 89 has an upper wall secured to the piston 81 and a lower annular end secured between annular flanges 92 of the cylinder. As the piston moves up and down in the cylinder, the reservoir flexes between the upper position shown in full lines to the lower dotted line position. An air conduit 93 extends through the lower wall of the cylinder and communicates with the interior of the air reservoir 89. The conduit 93 is also connected to an air supply such as the usual air bottle or container 94 in which air is maintained at a constant pressure. A manually adjustable pressure regulator (not shown) is provided to vary the air pressure to the reservoir.

When the tool carrier 27 is lowered under the control of the cam 49, air in the closed system below the piston 81 is compressed. Then, when the carrier 27 is again raised, the expanding air applies a lifting force through the bars 53 to augment the lifting force of the cam. By regulating the pressure of the air in the system, an optimum percentage of the weight of the tool carrier will be carried by the pneumatic system. It is desirable that the pneumatic system bear about 80 percent of the weight of the tool carrier 27. With such an arrangement, the machine operates smoothly, and the cam 49 and associated parts are small enough to be efficiently arranged in the base.

Each fruit holder 30 is of the type disclosed in my above-mentioned application Ser. No. 109,798, and reference may be had to that application for details of construction and operation. In general, each holder comprises a rigid ring 106 which is secured to an upwardly projecting arm 109 of a mounting bracket 102 that is secured to the main turret 25. The ring 106 is provided with an air inlet opening 112 which communicates with a passage 113 formed in the arm 109. A tubular fruit gripper member 115, which is made of thin pliable sheet material, such as the material from which the air reservoir 89 is made, has its upper end clamped in a recess 117 in the upper edge of the ring 106 by a metal clamping band 119. The lower end of tubular member 115 is clamped in a recess 120, formed in the lower edge of ring 106, by a metal clamping band 121. Thus, the tubular gripper member cooperates with the inner wall of the ring 106 to define an annular air chamber 122 which communicates with the air inlet opening 112.

A plurality of spaced hold-down fingers 123 are mounted in the air chamber 122 to prevent the lower end of the tubular gripper from moving upwardly in the space between the ring 106 and the fruit while the gripper is being inflated.

Air is forced into each inflatable gripper at station 2 in the manner described in my above-mentioned pending application Ser. No. 109,798, and the gripper remains inflated until after the sectionized fruit has been subjected to the action of the shaker S at station 10, as explained in said application.

As previously mentioned, the present invention provides means for removing the portion of the peripheral membrane at the blossom end of each fruit. It will be recalled that the operator places each fruit on the feed turret 31 with its blossom end uppermost and with its stem-blossom axis disposed generally vertically. Also, as explained in the afore-mentioned Grotewold application Ser. No. 730,335, the transfer turret 32 removes the fruit from the feed turret and positions it in one of the inflatable grippers with the blossom end of the fruit still disposed uppermost. Accordingly, when each fruit reaches station 3 it is positioned directly below the cutter unit C of the present invention that is mounted on the vertically reciprocable tool carrier 27 thereabove.

The cutter unit C comprises an electric motor 125, which may be energized from any suitable source of electrical power and is provided with two plates 126 and 127 fixed on its opposite sides. Bolts 128, which extend through suitable openings in the plates 126 and 127 and through slots 129 in an inverted U-shaped bracket 130, adjustably mount the cutter unit C on the tool carrier 27. A cutting blade 132, which is mounted on the lower end of the output shaft 133 of the motor, comprises a hub 135, that is setscrewed to the shaft 133, and two identical blades 137. The blades are formed integral with the hub 135 and each blade has a flat planar portion 139 and a downwardly inclined portion 140 that terminates in a sharpened edge 141. A generally cylindrical guard 142 (FIG. 3) is secured to the lower end of the motor 125 in any convenient manner. The lower end of the guard 142 is larger in diameter than the blossom end of the fruit so that it will not interfere with the engagement of the rapidly rotating cutter with the fruit.

Since the purpose of the cutter C is to remove the membrane at the blossom end of the fruit with as little damage as possible to the flesh of the fruit, it is desirable that the upper surface of the blossom end of each fruit G be positioned at the same elevation, as for example, at the elevation indicated by plane P in FIG. 3. Then, since the tool carrier moves downward the same distance during each vertical reciprocation, the cutting blade 132 will cut down into each fruit the same distance. Further, since the position of the blade 132 relative to the tool carrier 27 can be varied by manipulation of the bolts 128, the amount the blade 132 cuts into each fruit can be accurately controlled.

Each fruit, regardless of its size, is lowered to a position wherein its upper surface is in plane P by means of a fruit support unit 180 (FIGURES 3, 6 and 7). Each support unit 180 comprises a disc 182 which is fixed on the upper end of a locking rod 184 that is mounted for vertical sliding movement in a vertically positioned tubular mounting post 186 which extends upwardly from a flat outer end portion 188 of the mounting arm 189 which is mounted on turret 25 as seen in FIG. 2. A bore 190 extends vertically through the end portion 188, and a lower projection 192 of the tubular mounting post 186 is secured in the bore 190 by any suitable means, such as welding. The tubular mounting post 186 includes a hub portion 196 and a smaller upper neck portion 198, both of which are integrally formed. A bore 200 extends axially through the lower end 192, the hub portion 196, and partly into the neck 198 wherein it is enlarged into a counterbore 202.

The fruit support locking rod 184 (FIG. 7), which has a cylindrical block 204 integrally formed near its upper end, is slidably disposed in the bore 200, and the lower end portion of the block 204 is received for vertical sliding movement within the upper end of the counterbore 202. A tubular juice shield 206 depends from the fruit support disc 182 and is telescoped over the upper end of the neck portion 198 to prevent fruit juices from entering the tubular mounting post 186. The fruit support disc 182 is urged upwardly by a compression spring 208 which is mounted on the locking rod 184 in the counterbore 202 and is held in compression between the bottom end of the block 204 and a shoulder 210 formed between the bore 200 and the counterbore 202.

The upward movement of the locking rod 184 is limited by a locking member 212 (FIGS. 6 and 7) which has an upper end portion 214 that extends toward the turret and overlies a shoulder 216 formed by an elongate semi-cylindrical recess 217 provided in the locking rod 184 near its lower end. The locking member 212 is of generally C-shaped configuration having an inwardly turned lower end 218, an elongate body section 220 and the above-mentioned upper end 214. A vertically disposed radial slot 222 is formed in the outer wall of the mounting post 186 and a slot 224 having walls coplanar with the slot 222, is formed in the outer end of the mounting arm 189. The locking member 212 is disposed in the aligned slots 222, 224 and a pivotal mounting for the lock 212 is provided by a pivot pin 226 which extends through the upper end 214 and through the mounting post 186 wherein it is retained by cotter pins 228. The lower end portion 218 of the lock 212 is pivotally connected by a pivot pin 230 to a bifurcated outer end 232 of a spring mounting rod 234.

The spring mounting rod 234 is held in spaced parallel relation beneath the mounting arm 189 by an angle clip 236 which has a depending flange 238 that slidably journals the rod 234 near its inner end. The position of the clip 236 may be adjusted by means of a mounting screw 240 which extends through a slot 242 in the clip 236 and is threaded into the mounting arm 189. A compression spring 244 is disposed on the rod 234 between a washer 246 that abuts a face 250 of the bifurcated end 232, and the flange 238 of the angle clip 236, whereby the lock member 212 is urged to pivot about its pivot pin 226 in a direction moving an upper corner portion 252 of its upper end 214 toward a vertical wall 254 forming the base of the recess 217 in the locking rod 184.

At the time a fruit is first placed on the prong unit of the fruit support mechanism 180, the upper end 214 of the locking member 212 is held out of contact with the vertical wall 254 in the locking rod 184 by means of a stationary, lock-actuating cam strip 256 which is engaged by a cam roller 258 that is rotatably mounted upon a rod 260 depending from the lock 212. Portions of the cam strip 256 are spaced at different distances from the axis of the main turret in order to move the lock 212 to either allow the disc 182 to yield under a fruit being positioned on the prong unit or to lock the disc 182 after the fruit has been fully positioned on the unit. The cam 256 may be in the form of a continuous strip which is mounted in fixed position and extends completely around the main turret of the grapefruit sectionizing machine, or it may be formed in segments appropriately spaced about the axis of the main turret to actuate the lock 212 of the fruit support mechanism 180 at the proper times.

The prong unit comprises a plurality of impaling prongs 262 (FIG. 7) that extend vertically upward from a mounting hub 264, and are adapted to carry an impaled grapefruit through the several processing stations spaced around the main turret of the machine. Each prong 262 is retained in an aperture of the hub 264 by a wire lock 266 which is disposed in a circumferential groove 268 that is cut into the hub and into the outer surfaces of the prongs. A central bore 270 of the hub receives the tubular neck 198 of the mounting post 186 and the hub 264 is secured to the neck 198 by a set screw 272 (FIG. 6) in a position wherein its lower end abuts the upper end of the central portion 196 of the mounting post 186. Each prong 262 has a sharpened upper end and extends upwardly through one of a plurality of peripheral recesses 274 provided in the fruit support disc 182 to prevent rotation of the disc and the locking rod 184 to which it is secured.

As explained in the above-mentioned Grotewold application, the transfer turret 32 is provided with four radial arms 280 (FIG. 1), each of which has a plurality of depending prongs. The arms are mounted for vertical reciprocating movement with the tool carrier 27. Accordingly, each time the tool carrier moves downwardly, one of the sets of prongs on one radial arm of the transfer turret impales a fruit on the feed turret 31 and later deposits it, during a subsequent downward movement of the tool carrier, upon the prongs 262 of the fruit support units 180. At this particular time the cam 256 is holding the end 214 of locking member 212 out of engagement with the rod 184.

When the tool carrier has descended the full limit of its downward travel, the grapefruit attains the position illustrated in FIGURE 3. During the downward movement of the grapefruit G on the impaling prongs 262, the bottom of the fruit contacts the yieldable fruit support disc 182 and forces it downwardly against the pressure of the compression spring 208. After the grapefruit has been fully positioned on the prong unit and its upper end is placed in the predetermined horizontal plane previously mentioned, the tool carrier is raised to withdraw the prongs of the transfer turret arm from the upper end of the grapefruit while it is held fixed upon the impaling prongs 262 by a fruit hold-down mechanism (not shown), which may be of the type disclosed in said Grotewold application.

After the withdrawal of the prongs of the transfer turret from the upper portion of the fruit, the main turret rotates another 30°, the transfer turret 32 another 90°, and the lock actuating cam 256, by means of a locking portion that is displaced further away from the main turret, permits the cam follower roller 258 to move outwardly and thereby cause the lock member 212 to be pivoted by the spring 244 until its upper corner portion 252 contacts the vertical wall 254 of the recess 217 in the locking rod 184. As a result of the force provided by the spring 244, and the lock member's body portion 220 which acts as a long lever to apply that force, the corner portion 252 engages the vertical wall 254 with considerable pressure. This engagement of the lock member 212 and the locking rod 184 is firm enough to assure that neither vibration nor any other force will cause any relative movement therebetween until the lock member 212 is pivoted inwardly by the cam 256 at a later point in the cycle.

Accordingly, when each grapefruit reaches station 3, its upper surface is disposed in plane P (FIG. 3) and it is positioned directly beneath the rapidly rotating cutting blade 132. Then, when the tool carrier 27 is lowered, the blade cuts a predetermined, relatively small distance into the blossom end of the fruit to cut off any membrane at this point. When the blade has been raised, the turret is indexed to consecutively position the fruit below the sectionizing heads H1–H6. Each of the several blades of each sectionizing head is moved down into the fruit at a point between a radial membrane of the fruit and the adjacent meat portion of the fruit to separate the meat from the membrane. Some of the blades engage the fruit on one side of the pie-shaped meat segments while others engage the fruit on the other side of the segments. Accordingly, when the last head H6 has been moved upwardly out of the fruit, substantially all of the pie-shaped meat segments of the fruit have been separated from the two radial membranes that enclose it. At station 10, the fruit is reciprocated rapidly to shake the loosened meat segments free from the core, and at station 11 the core is wrapped around a central post to strip the remaining meat segments from the core.

The method of sectionizing peeled grapefruit by manipulating sectionizing blades to separate pie-shaped meat segments from the enclosing membranes is, of course, well known and, as mentioned before, this method cannot be effectively carried out if the preliminary lye treatment has not removed all of the membrane at the blossom end of the fruit. The present invention provides means for eliminating the obstacle caused by an ineffective lye treatment and has provided a new sectionizing method which comprises the steps of making a planar cut in the blossom end of a peeled grapefruit to remove the peripheral membrane of the fruit, and moving sectionizing blades into the blossom end of the fruit, and working the sectionizing blades through the fruit to separate each pie-shaped meat segment from both of its enclosing radial membranes. It is of course evident that the method of the present invention can be carried out mechanically by apparatus other than that disclosed in the present application. For example, the blossom end of each fruit could be manually pressed lightly against any rapidly rotating abrading member such as a wire brush 282 (FIG. 8), and then each pie-shaped segment could be separated from its enclosing membranes by manually manipulating a knife such as those employed in conventional, hand-sectionizing operations. The brush 282 could, of course, be mounted on the end of motor shaft 133 and the motor 125 so adjusted in appropriate slots in the bracket 130 that the brush would remove only the peripheral membrane. If desired, the contact surface of the brush could be contoured so that it would engage the desired area at the end of the fruit. However, it is to be particularly noted that the cutter of FIGS. 3–5 provides a particularly effective mechanism for carrying out the improved method of the present invention, and the adjustable mounting of the cutter provides means for accurately determining the depth of cut whereby the method may be carried out with a minimum loss of meat at the blossom end of the fruit.

Having thus described my invention, what I claim as new and desire to secure by Letters Patent is:

1. In a citrus fruit sectionizing machine, means for positioning a peeled citrus fruit in fixed position with its blossom end uppermost and at a predetermined elevation, an abrading member above said fruit positioning means, means mounting said abrading member for movement downwardly to contact the blossom end of the fruit in membrane removing engagement and means for stopping the downward movement of said abrading member at a point slightly below the upper surface of the fruit.

2. In a citrus fruit sectionizing machine, a fruit carrier, means for positioning a citrus fruit in said carrier with the axis of the fruit having a generally vertical orientation and with the blossom end of the fruit facing upwardly, means associated with said carrier for holding the fruit therein with said blossom end at a predetermined desired level, a membrane-abrading member disposed above said carrier, and means mounting said member for vertical movement downwardly to a position a short distance below said desired level to engage the blossom end of the fruit and remove the membrane therefrom.

3. In a citrus fruit sectionizing machine, a turret, a plurality of fruit carriers on said turret, means for indexing said turret in predetermined angular increments to position each fruit carrier at consecutive processing stations, means for positioning a peeled citrus fruit in each carrier with the stem-blossom axis in a generally vertical orientation and with the blossom end facing upwardly, means associated with each carrier for holding the fruit in the carrier with its upper end at a predetermined elevation, a membrane-removal member for engaging the blossom end of each fruit to remove a predetermined amount of membrane therefrom, said member being disposed above said turret at one of said processing stations, and means for moving said member downwardly a fixed distance to a position slightly below said predetermined elevation when each carrier is disposed at said one station.

References Cited by the Examiner

UNITED STATES PATENTS

| | | | |
|---|---|---|---|
| 1,925,196 | 9/33 | Maull | 146—52 X |
| 2,243,025 | 5/41 | Wilson | 146—3 |
| 2,549,333 | 4/51 | Polk et al. | 146—236 |
| 2,627,884 | 2/53 | Polk et al. | 146—3 |
| 2,688,993 | 9/54 | White | 146—52 |
| 2,716,480 | 8/55 | Dotta | 146—81 X |
| 2,822,843 | 2/58 | Morici | 146—52 |
| 3,017,913 | 1/62 | Sintetos | 146—81 |
| 3,018,808 | 1/62 | Belk | 146—236 |
| 3,030,990 | 4/62 | Polk | 146—3 |
| 3,030,995 | 4/62 | Shrewsbury | 146—236 |

J. SPENCER OVERHOLSER, *Primary Examiner.*